(12) United States Patent
Ishikawa et al.

(10) Patent No.: US 12,539,658 B2
(45) Date of Patent: Feb. 3, 2026

(54) RESIN EXTRUDER, ROTOR-TYPE SCREW SHAPED SO THAT THE SIZE OF THE GAP BETWEEN THE SCREW AND THE INNER SURFACE OF THE CYLINDER HOLDING THE SCREW CHANGES, AND RESIN MANUFACTURING METHOD

(71) Applicant: THE JAPAN STEEL WORKS, LTD., Tokyo (JP)

(72) Inventors: Makoto Ishikawa, Tokyo (JP); Kyouhei Yata, Tokyo (JP); Yohei Shimizu, Tokyo (JP); Masao Kurihara, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 936 days.

(21) Appl. No.: 17/638,823

(22) PCT Filed: Aug. 5, 2020

(86) PCT No.: PCT/JP2020/029931
§ 371 (c)(1),
(2) Date: Feb. 26, 2022

(87) PCT Pub. No.: WO2021/065192
PCT Pub. Date: Apr. 8, 2021

(65) Prior Publication Data
US 2022/0324152 A1    Oct. 13, 2022

(30) Foreign Application Priority Data
Oct. 1, 2019   (JP) .................................. 2019-181458

(51) Int. Cl.
*B29C 48/60*    (2019.01)
*B29B 7/48*     (2006.01)
(Continued)

(52) U.S. Cl.
CPC .............. *B29C 48/60* (2019.02); *B29B 7/489* (2013.01); *B29C 48/415* (2019.02); *B29C 48/595* (2019.02)

(58) Field of Classification Search
CPC ..... B29C 48/60; B29C 48/415; B29C 48/595; B29C 48/395; B29C 48/405; B29C 48/57;
(Continued)

(56) References Cited

U.S. PATENT DOCUMENTS

| 4,456,381 A | 6/1984 | Inoue et al. |
| 4,917,501 A | 4/1990 | Simonet et al. |

(Continued)

FOREIGN PATENT DOCUMENTS

| DE | 102017108470 B3 * | 5/2018 | ......... B29C 45/0005 |
| EP |      875356 A2 *  | 11/1998 | ............. B29B 7/482 |

(Continued)

OTHER PUBLICATIONS

Office Action issued Jun. 19, 2023, in Chinese Patent Application No. 202080069074.4.
(Continued)

*Primary Examiner* — Charles Cooley
(74) *Attorney, Agent, or Firm* — Potomac Law Group, PLLC

(57) ABSTRACT

A resin extruder capable of efficiently improving performance of kneading a resin material is provided. A resin extruder (1) according to one embodiment includes a cylinder (20), and a rotor-type screw (33) that is disposed in the cylinder (20) and kneads a resin material (51). In the rotor-type screw (33), a top part (33b) of a flight (33a) is formed in such a way that a gap between the top part (33b) and an inner surface of the cylinder (20) is changed from a
(Continued)

front point to a rear point of the rotor-type screw in a rotation direction in a cross section that is vertical to an axial direction.

5 Claims, 12 Drawing Sheets

(51) Int. Cl.
*B29C 48/415* (2019.01)
*B29C 48/595* (2019.01)

(58) Field of Classification Search
CPC .. B29C 48/59; B29B 7/48; B29B 7/18; B29B 7/22
USPC .......................................... 366/79–90, 96–99
See application file for complete search history.

(56) References Cited

U.S. PATENT DOCUMENTS

| | | | |
|---|---|---|---|
| 5,267,788 A * | 12/1993 | Rockstedt | B29C 48/395 366/85 |
| 5,520,455 A * | 5/1996 | Yamada | B29B 7/186 366/97 |
| 5,573,332 A * | 11/1996 | Weihrich | B29C 48/402 366/85 |
| 7,188,992 B2 * | 3/2007 | Mattingly, Jr. | B29B 7/481 366/85 |
| 9,085,093 B2 * | 7/2015 | Ikeda | B29B 7/483 |
| 2005/0024986 A1 * | 2/2005 | Mattingly, Jr. | B29B 7/483 366/85 |
| 2011/0222364 A1 | 9/2011 | Yoshida et al. | |
| 2025/0196077 A1 * | 6/2025 | Koenig | B29C 48/402 |
| 2025/0242533 A1 * | 7/2025 | Koenig | B29C 48/405 |

FOREIGN PATENT DOCUMENTS

| | | | | |
|---|---|---|---|---|
| EP | 2374600 A1 * | 10/2011 | | B29B 7/481 |
| JP | H02-32812 A | 2/1990 | | |
| JP | H07-33611 U | 6/1995 | | |
| JP | 2010-162511 A | 7/2010 | | |
| WO | WO 94/22649 A1 | 10/1994 | | |
| WO | WO-2009152973 A1 * | 12/2009 | | B29B 7/481 |
| WO | WO-2012090585 A1 * | 7/2012 | | B29B 7/481 |

OTHER PUBLICATIONS

International Search Report from International Patent Application No. PCT/JP2020/029931, Sep. 15, 2020.

* cited by examiner

RESIN EXTRUDER, ROTOR-TYPE SCREW SHAPED SO THAT THE SIZE OF THE GAP BETWEEN THE SCREW AND THE INNER SURFACE OF THE CYLINDER HOLDING THE SCREW CHANGES, AND RESIN MANUFACTURING METHOD

TECHNICAL FIELD

The present invention relates to a resin extruder, a rotor-type screw, and a resin manufacturing method.

BACKGROUND ART

Extruders used for processes of mixing and devolatilizing a resin material have been known. As disclosed in Patent Literature 1, for example, an extruder includes screws fitted with a shaft, and the screws are provided in separate places in the axial direction of the shaft, in accordance with the respective functions of the screws. Specifically, a screw for mainly conveying a resin material is provided in an introduction part through which the resin material is introduced and a screw for plasticizing and kneading the resin material is provided in the downstream of the screw for conveying the resin material. A screw for conveying the kneaded resin material toward a die (a discharge opening) is further provided in the downstream of the screw for plasticizing and kneading the resin material. A kneading disk-type screw or a rotor-type screw as the screw for plasticizing and kneading the resin material is known.

CITATION LIST

Patent Literature

[Patent Literature 1] Japanese Unexamined Patent Application Publication No. 2010-162511

SUMMARY OF INVENTION

Technical Problem

It is required to improve kneading performance of a resin extruder including a rotor-type screw that kneads a resin material.

The other problems and the novel features will be made apparent from the descriptions of the specification and the accompanying drawings.

Solution to Problem

A resin extruder according to one embodiment includes: a cylinder; and a rotor-type screw that is disposed in the cylinder and kneads a resin material, in which, in the rotor-type screw, a top part of a flight is formed in such a way that a gap between the top part and an inner surface of the cylinder is changed from a front point to a rear point of the rotor-type screw in a rotation direction in a cross section that is vertical to an axial direction.

Advantageous Effects of Invention

According to the above embodiment, it is possible to provide a resin extruder capable of efficiently improving performance of kneading a resin material.

DESCRIPTION OF EMBODIMENTS

Hereinafter, with reference to the drawings, specific embodiments will be described in detail. However, the present disclosure is not limited to the following embodiments. For the sake of clarification of the description, the following descriptions and the drawings are omitted as appropriate. Throughout the drawings, the same elements are denoted by the same reference symbols and duplicated descriptions are omitted as needed. Further, some areas are not hatched in order to prevent the drawings from being complicated.

First Embodiment

<Overall Structure of Resin Extruder>

First, with reference to FIG. 1, the overall structure of a resin extruder according to a first embodiment will be described.

Figure 1:
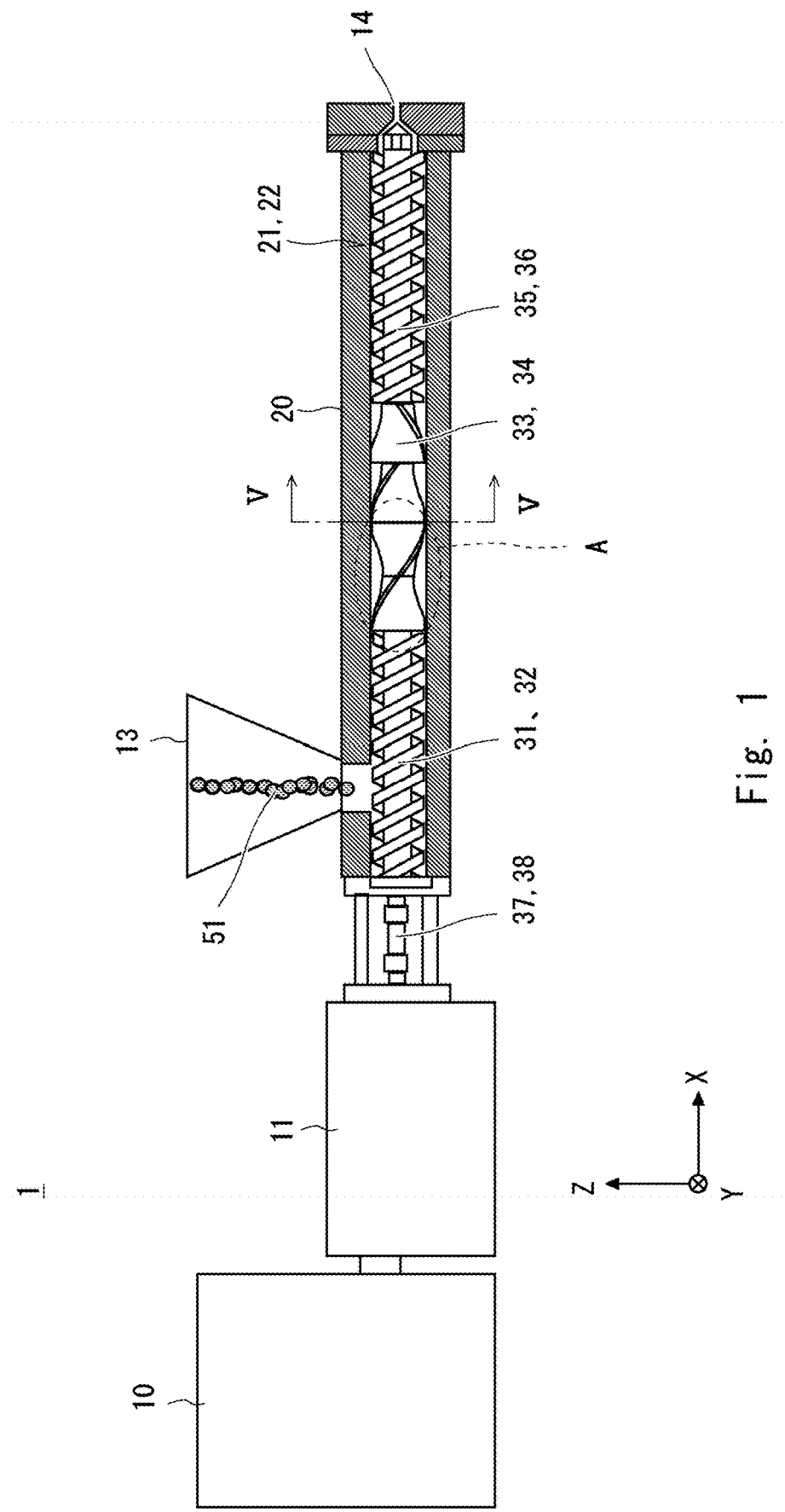
FIG. 1 is a schematic cross section showing an outline of an extrusion molding machine and a method of manufacturing a molded object according to a first embodiment.

FIG. 1 is a side view illustrating a configuration of a resin extruder according to a first embodiment. As shown in FIG. 1, a resin extruder 1 is, for example, a continuous twin screw extruder for resins. The resin extruder 1 includes a driving unit 10, a decelerator 11, a cylinder 20, and screws 21 and 22. The resin extruder 1 is used, for example, for processes of mixing and devolatilizing a resin material 51.

Here, for the sake of convenience of explanation of the resin extruder 1, an XYZ rectangular coordinate axis system is introduced. For example, a direction in which the cylinder 20 is extended is called an X-axis direction and two directions perpendicular to the X-axis direction are called a Y-axis direction and a Z-axis direction. For example, the Z-axis direction is a vertical direction and the XY-plane is a horizontal plane. Further, the +Z-axis direction is upward, and a direction in which the resin material 51 is pushed out in the resin extruder 1 is a +X-axis direction. The vertical direction and the horizontal direction used herein include some errors that inevitably occur when the resin extruder 1 is installed in the exact vertical direction and the exact horizontal direction.

The driving unit 10 is disposed in one end side of the cylinder 20, for example, on the −X-axis direction side of the cylinder 20. The driving unit 10 rotates the screws 21 and 22. The driving unit 10 is, for example, a motor. The decelerator 11 is disposed between the driving unit 10 and the screws 21 and 22. The decelerator 11 adjusts the rotation of the driving unit 10 and transmits the adjusted rotation power to the screws 21 and 22. Therefore, the screws 21 and 22 are rotated by a power source of the driving unit 10 adjusted by the decelerator 11.

The cylinder 20 is a cylindrical member that is extended in the X-axis direction. The cylinder 20 has a hollow part inside thereof. The cylinder 20 houses the two screws 21 and 22 therein. A hopper 13 for introducing the resin material 51 is provided on the cylinder 20 on the −X-axis direction side of the cylinder 20. An outlet 14 from which the kneaded resin material is expelled is provided in the end part of the cylinder 20 on the +X-axis direction side.

The screws 21 and 22 are inserted through the opening of the cylinder 20 on the −X-axis direction side. The root parts of the screws 21 and 22 on the −X-axis direction side are extended outward from the opening of the cylinder 20, and are connected to the driving unit 10 via the decelerator 11. The screw 21 is rotated about a rotation axis 37 that is extended in the X-axis direction. The screw 22 is rotated about a rotation axis 38 that is extended in the X-axis direction in a position close to the screw 21 in the Y-axis direction. The rotation axes 37 and 38 are disposed in parallel to each other in the Y-axis direction with a gap therebetween.

The inner surface of the cylinder 20 includes a cylindrical inner surface along a trajectory in which outer edges of the screws 21 and 22 are rotated. Roughly speaking, the inner surface of the cylinder 20 includes a cylindrical inner surface along a trajectory in which the outer edge of the screw 21 is rotated coupled to a cylindrical inner surface along a trajectory in which the outer edge of the screw 22 is rotated. For example, a cross section of the inner surface of the cylinder 20 perpendicular to the X axis (cross section that is vertical to the axial direction) has a figure of eight shape in which parts of two circles are coupled to each other.

The screw 21 is formed of an upstream conveying screw 31 and a downstream conveying screw 35 for conveying the resin material, and a rotor-type screw 33 that is disposed between the upstream conveying screw 31 and the downstream conveying screw 35 and is used to knead the resin material. The screw 22 is disposed on the −Y-axis direction side of the screw 21. The screw 22 is formed of an upstream conveying screw 32 and a downstream conveying screw 36 for conveying the resin material and a rotor-type screw 34 that is disposed between the upstream conveying screw 32 and the downstream conveying screw 36 and is used to knead the resin material.

<Configuration of Rotor-Type Screw>

Next, a configuration of the rotor-type screws 33 and 34 will be described.

Figure 2:
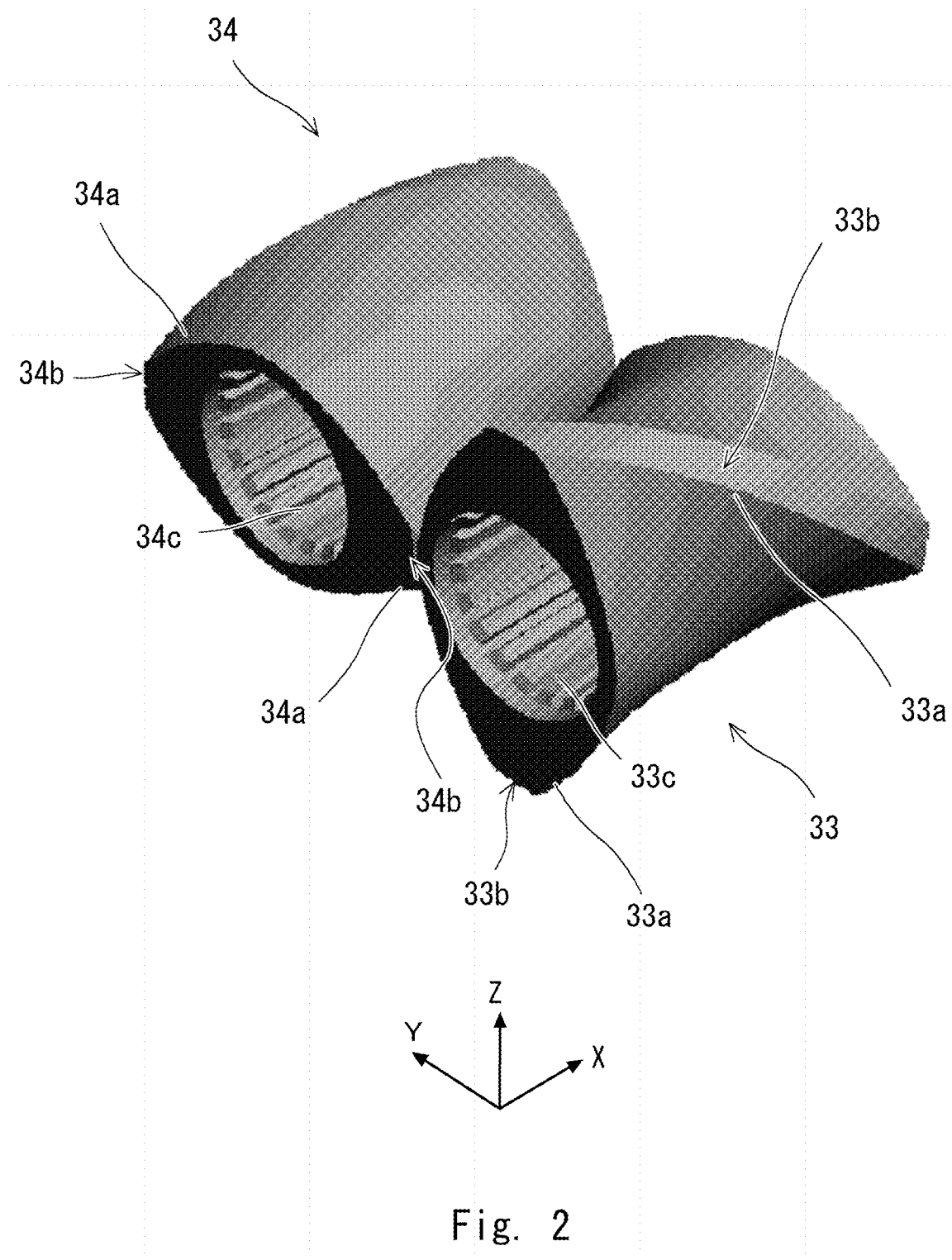
FIG. 2 is an enlarged view of a part of a rotor-type screw shown in FIG. 1 surrounded by a broken line A.

FIG. 2 is an enlarged view of a part of the rotor-type screw shown in FIG. 1 surrounded by a broken line A. As shown in FIG. 2, the rotor-type screws 33 and 34 are shaped in such a way that flights 33a and 34a are twisted in a spiral shape with respect to an axis line. The flights 33a and 34a include top parts 33b and 34b. Further, the rotor-type screws 33 and 34 include holes 33c and 34c fitted with the rotation axes 37 and 38 (see FIG. 1). The outer diameter and the shape of the rotor-type screw 33 are the same as those of the rotor-type screw 34.

<Operations of Resin Extruder>

Next, operations of the resin extruder 1 according to the first embodiment will be described. In the following description, FIG. 1 is referred to as appropriate.

The resin material 51 introduced from the hopper 13 into the cylinder 20 in a form of powder is transported in the +X-axis direction by the upstream conveying screws 31 and 32, and is then melted inside the cylinder 20 due to heat applied from a heater (not shown) attached to the cylinder 20 and as a result of kneading by the rotor-type screws 33 and 34. The kneaded resin is conveyed further in the +X-axis direction by the downstream conveying screws 35 and 36 and is then expelled from the outlet 14.

<Shape of Rotor-Type Screw According to Comparative Example 1>

Next, a rotor-type screw according to Comparative Example 1 conceived by the inventors in advance will be described.

Figure 3:
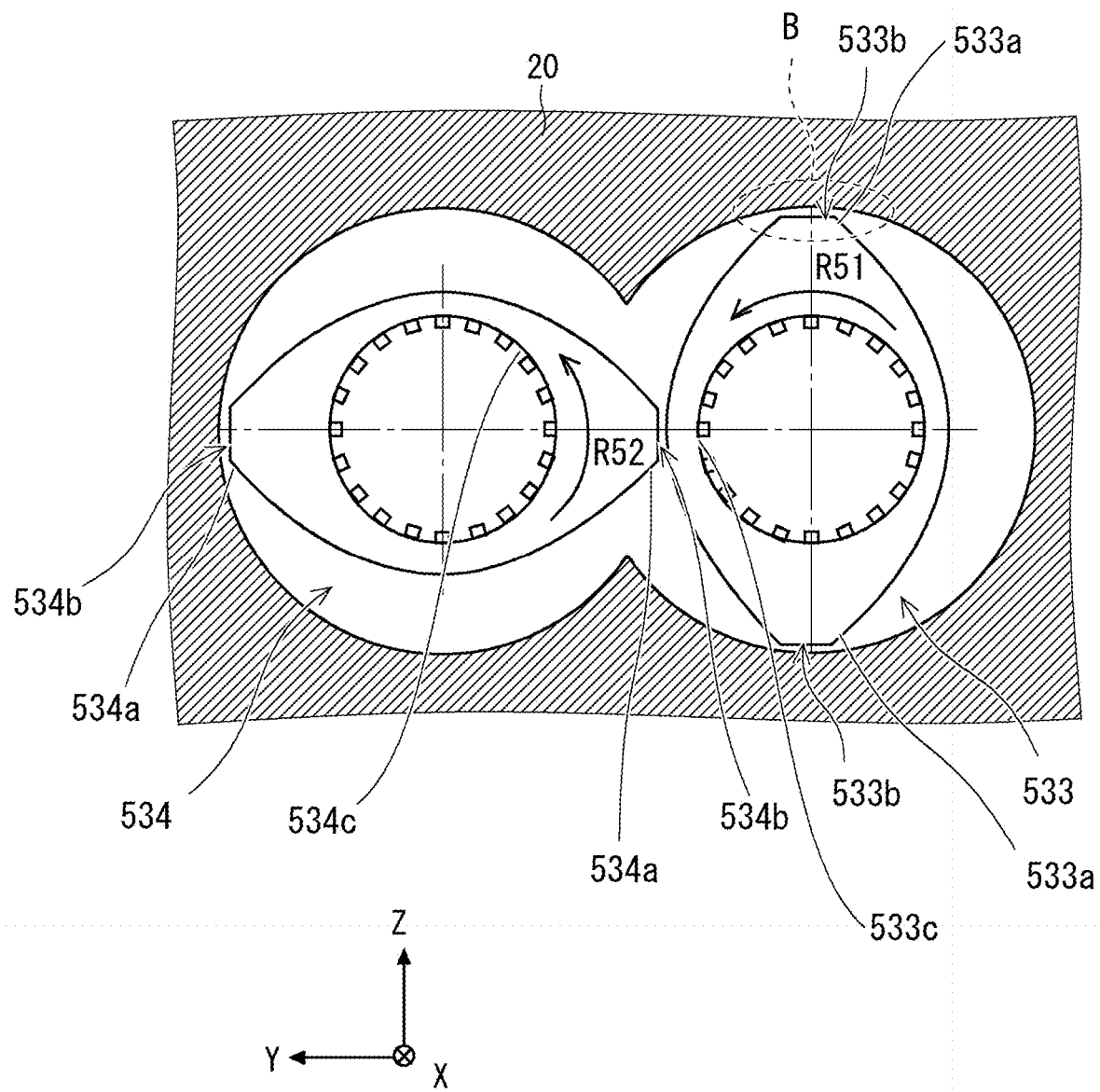
FIG. 3 is a diagram showing the shape of a cross section that is vertical to an axial direction of a rotor-type screw according to Comparative Example 1.

FIG. 3 is a diagram showing the shape of the cross section of the rotor-type screw according to Comparative Example 1 that is vertical to the axial direction. This cross section corresponds to the cross section of the resin extruder 1 shown in FIG. 1 along the line V-V. As shown in FIG. 3, a rotor-type screw 533 is rotated in the direction of an arrow R51 and a rotor-type screw 534 is rotated in the direction of an arrow R52. The outer diameter and the shape of the rotor-type screw 533 are the same as those of the rotor-type screw 534. Therefore, in the following, the shape of the rotor-type screw 533 will be described as a representative example.

Figure 4:
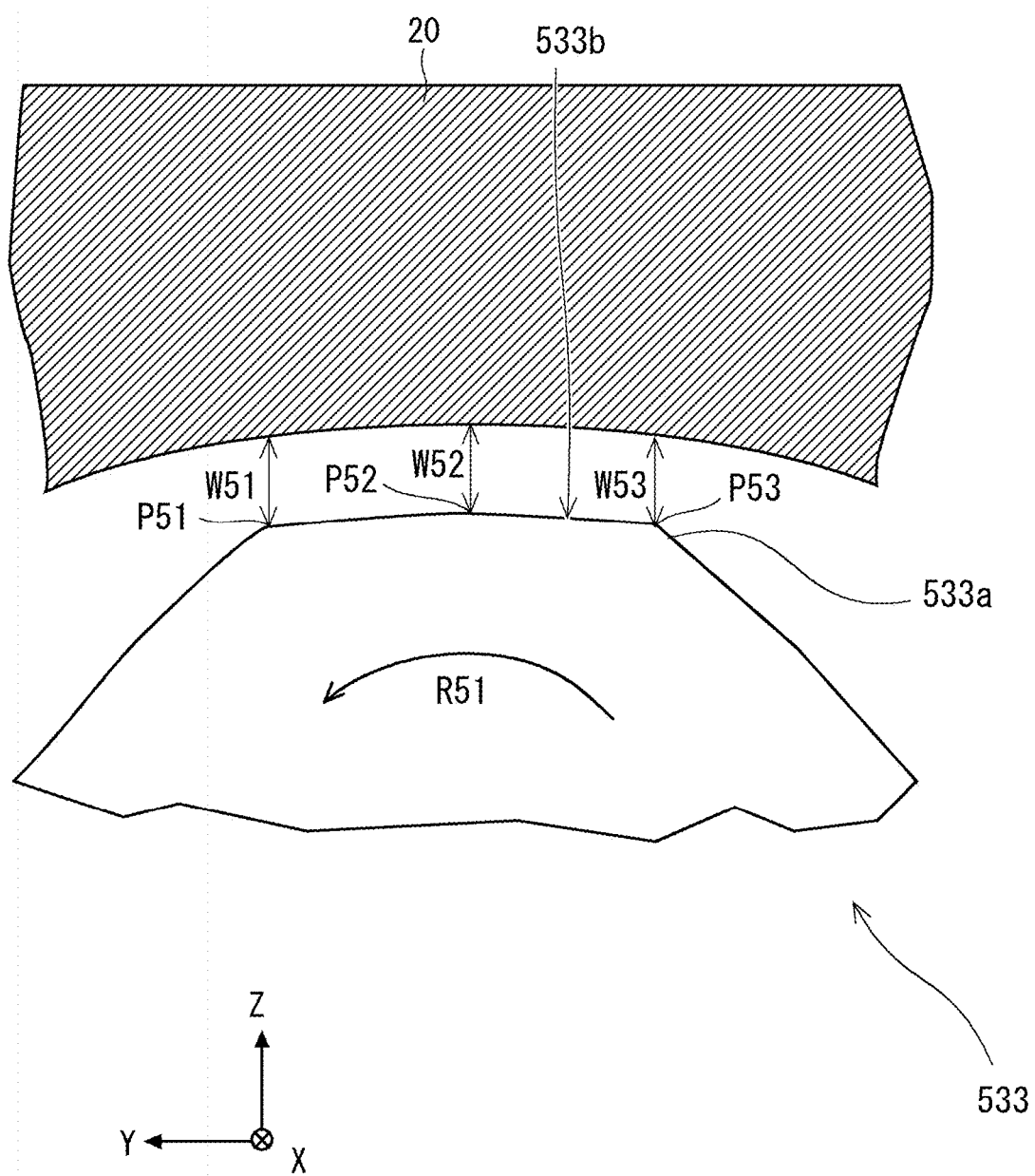
FIG. 4 is an enlarged view of a region surrounded by a broken line B shown in FIG. 3.

FIG. 4 is an enlarged view of a region surrounded by a broken line B shown in FIG. 3. As shown in FIG. 4, in the rotor-type screw 533, a top part 533b of a flight 533a is formed in such a way that a gap between the top part 533b and the inner surface of the cylinder 20 becomes constant from a front point to a rear point of the rotor-type screw 533 in the rotation direction in a state in which the top part 533b of the flight 533a is opposed to the inner surface of the cylinder 20. Hereinafter, the gap between the top part 533b and the inner surface of the cylinder 20 is simply referred to as a gap. A size W51 of a gap (the width of the gap) at a front point P51 of the top part 533b of the flight 533a in the rotation direction R51, a size W52 of a gap at an intermediate point P52, and a size W53 of a gap at a rear point P53 are the same.

The inventors of the present application have found that, if a resin material that is difficult to be kneaded or dispersed is used, when the rotor-type screws 533 and 534 according to Comparative Example 1 are used for the resin extruder 1, it may be difficult to knead and disperse the resin material to a sufficient degree without excessively increasing the temperature of the resin. The resin material that is difficult to knead or disperse is, for example, a plurality of resins with different viscosities or a filler having a strong cohesive force.

It is important in a resin extruder to cause effects of shear deformation and extensional deformation to be exerted on the resin material in kneading or dispersion of the resin material. When the resin material is deformed by shearing, the energy imparted to the resin material is used not only to knead or disperse the resin material but also to rotate the resin material. Since heat is generated when the resin material is rotated, the temperature of the resin material is increased when the resin material is deformed by shearing. On the other hand, when the resin material is extended and deformed, the energy imparted to the resin material is mainly used for kneading or dispersion of the resin material. That is, the amount of heat generated in the case in which the resin material is extended and deformed becomes smaller than that in the case in which the resin material is deformed by shearing, whereby it is possible to achieve kneading or dispersion more efficiently in the case in which the resin material is extended and deformed. In the aforementioned case in which the rotor-type screws 533 and 534 according to Comparative Example 1 are used for the resin extruder 1, it can be estimated that it is impossible to efficiently cause effects of the extensional deformation to be exerted on the resin material.

<Shape of Rotor-Type Screw According to First Embodiment>

Next, the rotor-type screw according to the first embodiment will be described.

Figure 5:
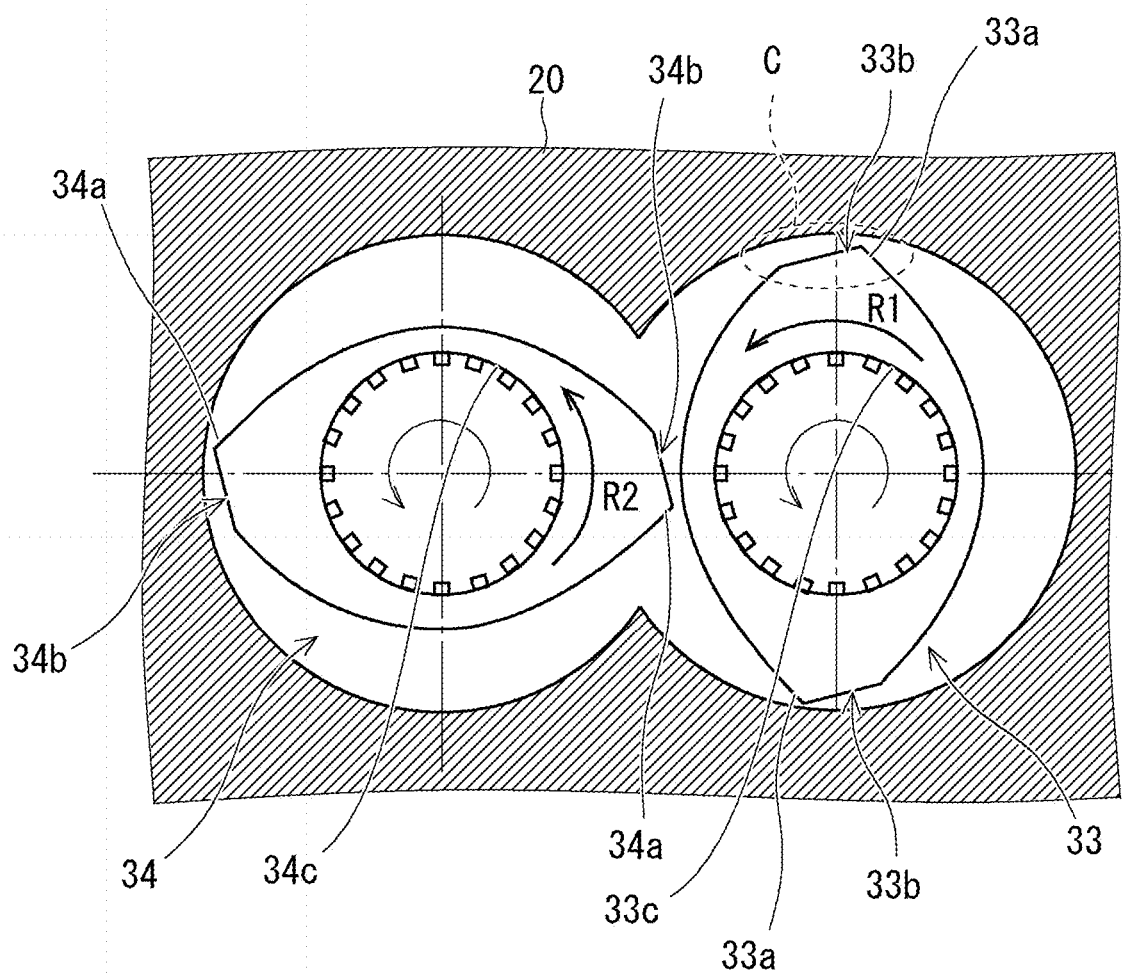
FIG. 5 is a diagram showing the shape of a cross section that is vertical to an axial direction of the rotor-type screw according to the first embodiment.

FIG. 5 is a diagram showing the shape of the cross section of the rotor-type screw according to the first embodiment that is vertical to the axial direction. This cross section corresponds to the cross section of the resin extruder 1 shown in FIG. 1 along the line V-V. As shown in FIG. 5, the rotor-type screw 33 is rotated in the direction of an arrow R1 and the rotor-type screw 34 is rotated in the direction of an arrow R2. The outer diameter and the shape of the rotor-type screw 33 are the same as those of the rotor-type screw 34. Therefore, as a representative example of the rotor-type screw, the shape of the rotor-type screw 33 will be described.

Figure 6:
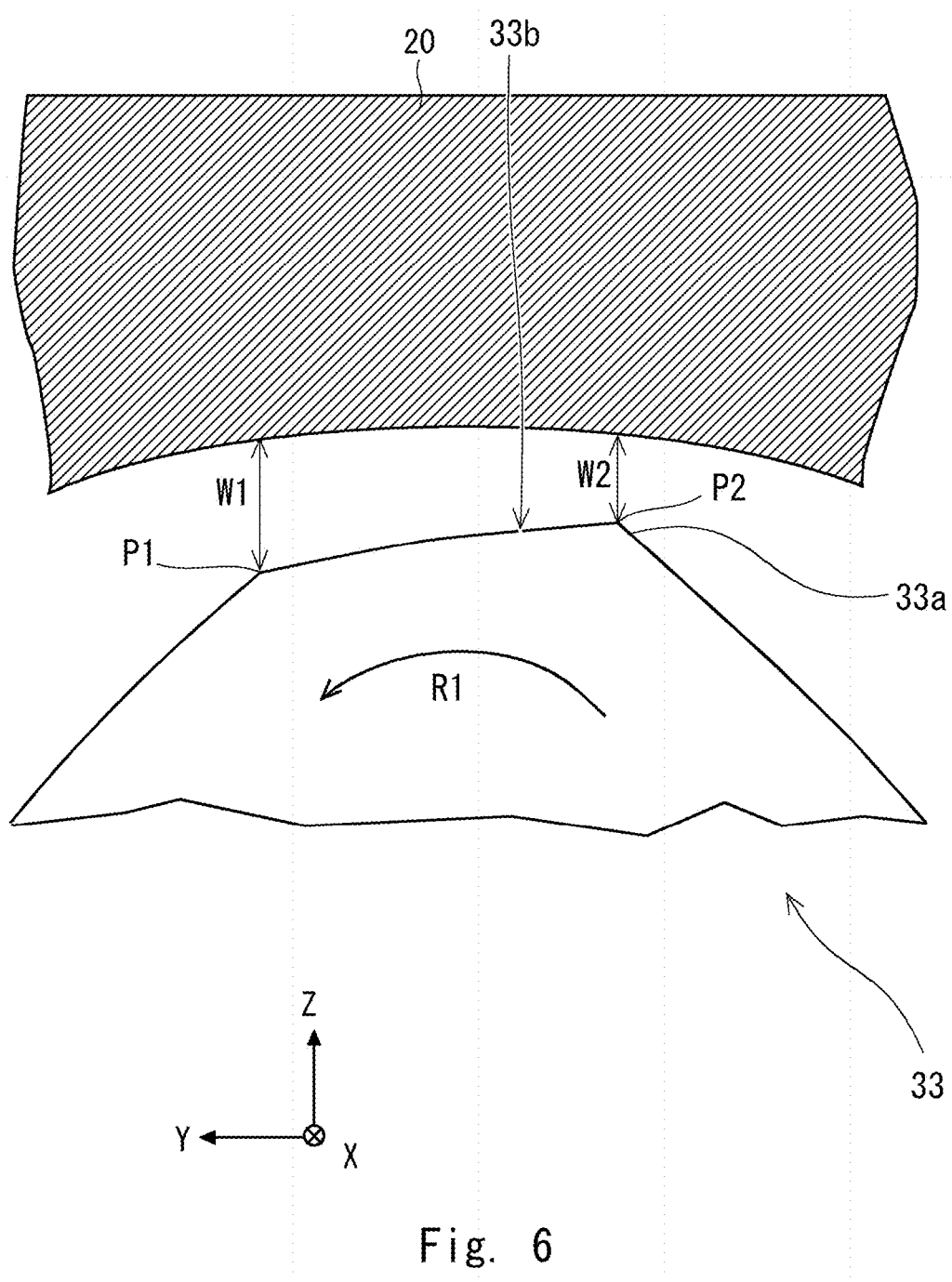
FIG. 6 is an enlarged view of a region surrounded by a broken line C shown in FIG. 5.

FIG. 6 is an enlarged view of a region surrounded by a broken line C in FIG. 5. As shown in FIG. 6, in the rotor-type screw 33, the top part 33b of the flight 33a is formed in such a way that the gap between the top part 33b and the inner surface of the cylinder 20 is changed from a front point to a rear point of the rotor-type screw 33 in the rotation direction in a state in which the top part 33b of the flight 33a is opposed to the inner surface of the cylinder 20. Hereinafter, the gap between the top part 33b and the inner surface of the cylinder 20 will be simply referred to as a gap. In this example, in the rotor-type screw 33, the top part 33b of the flight 33a is formed in such a way that the size of the gap is gradually decreased from the front point P1 to the rear point P2 in the cross section that is vertical to the axial direction. That is, a size W2 of the gap at the rear point P2 of the top part 33b in the rotational direction R1 is smaller than a size W1 of the gap at the front point P1 thereof.

Figure 7:
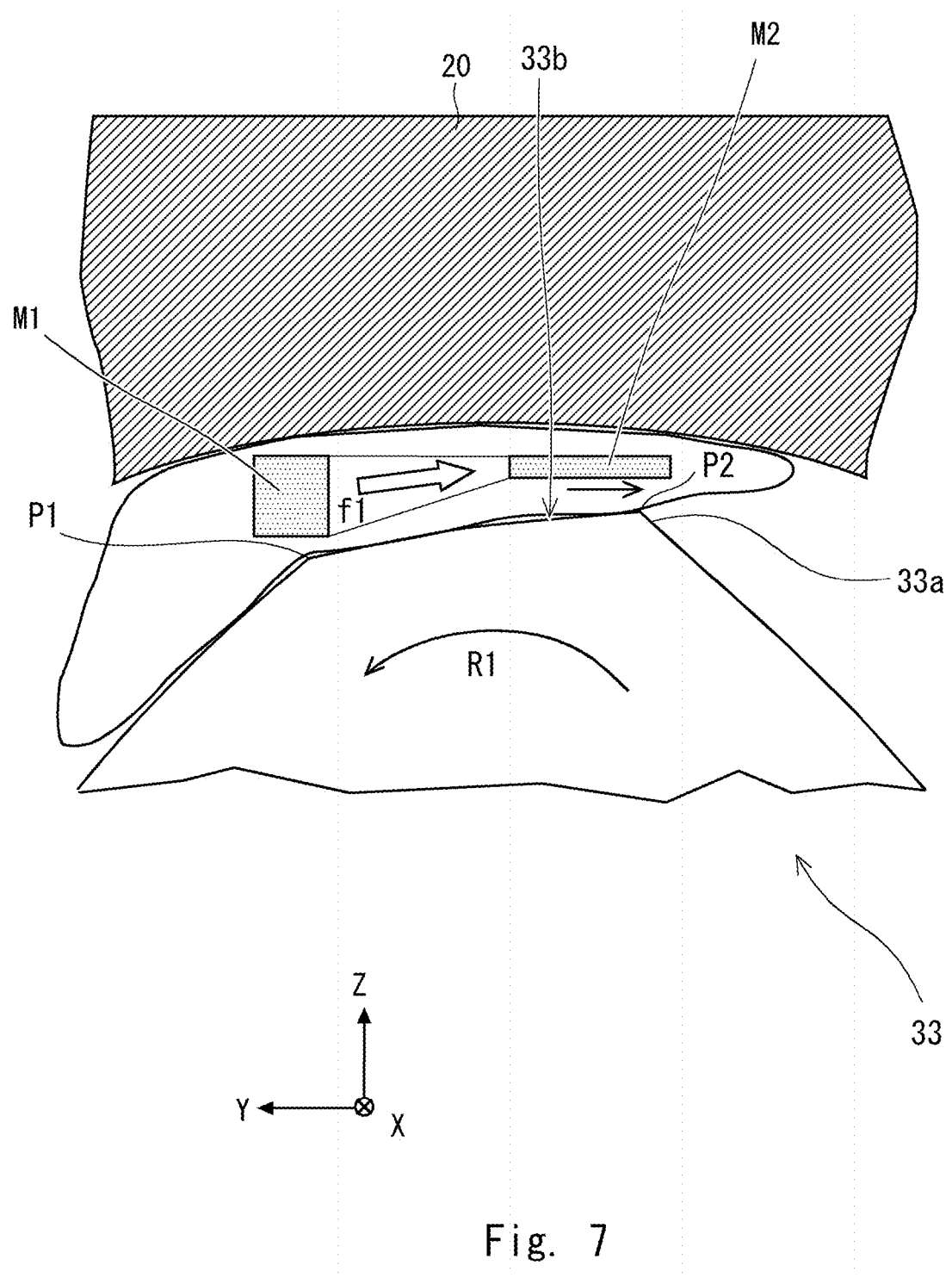
FIG. 7 is a schematic view showing effects of extensional deformation exerted on a resin material by the rotor-type screw according to the first embodiment.

FIG. 7 is a schematic view showing effects of the extensional deformation exerted on the resin material by the rotor-type screw according to the first embodiment. As shown in FIG. 7, when the rotor-type screw 33 is rotated in the direction of the arrow R1, the resin material that is present in the gap flows in the direction of an arrow f1. A high stress and a high pressure are applied to the resin material that is present in the gap. When a matrix M1, which is a base material of the resin material which is located at the entrance of the gap, is pushed and made to flow in the direction of the arrow f1 in a tapered channel under a high stress, a high pressure, and a high flow resistance, the matrix M1 is elongated in the direction of the arrow f1 and is deformed like a matrix M2 at the exit of the gap. Here, the entrance of the gap is positioned at the front point P1 of the top part 33b of the flight 33a in the rotation direction and the exit of the gap is positioned at the rear point P2 of the top part 33b of the flight 33a in the rotation direction.

As described above, when the size of the gap is gradually decreased from the front point P1 to the rear point P2 of the top part 33b in the rotation direction, the base material of the resin material that passes through the gap is elongated. When the base material of the resin material is elongated, the base material tends to collapse, which promotes kneading of a plurality of base materials that are components of the resin material.

<Test for Comparing Kneading Performance>

Next, a test in which the kneading performance of the rotor-type screw according to the first embodiment is compared with the kneading performance of the rotor-type screw according to the comparative example will be described.

In this test, a twin screw extruder CMP69 manufactured by The Japan Steel Works, Ltd. was used as a resin extruder. The inner diameter of the cylinder of the twin screw extruder CMP69 was set to 69 mm, the rotation speed of the screw was set to 240 rpm, the temperature of the cylinder was set to 200° C., and the throughput of the raw material was set to 300 kg/h. Further, a block copolymer polypropylene (Melt Flow Rate (MFR) under 230° C. and 2.16 kg load: 3) was used as a resin material.

In this test, films were prepared by an extruded and discharged object kneaded by a resin extruder in which the rotor-type screw according to the first embodiment is employed and an extruded and discharged object kneaded by a resin extruder in which the rotor-type screw according to the comparative example is employed. Then, the number of gels per unit area was counted for each of the films that have been prepared. The greater the insufficiency of the kneading or the dispersion of the base material (matrix) of a component having a high viscosity or a component having a high molecular weight in the kneaded object, the greater the number of gels generated in the film. That is, it can be determined that the smaller the number of gels per unit area in the film is, the higher the kneading performance is.

Further, in the above test, the specific energy (SEI) [kWh/kg] of the extruder was changed for each of the resin extruder in which the rotor-type screw according to the first embodiment is employed and the resin extruder in which the rotor-type screw according to the comparative example is employed. The SEI, which is obtained by dividing the consumption power of the extruder [kW] by the throughput of the extruder [kg/h], is an index of the energy that the extruder has imparted to the resin material. The SEI was changed by regulating an opening degree of a throttle valve installed downstream of the kneading part of the twin screw extruder CMP69.

Figure 8:
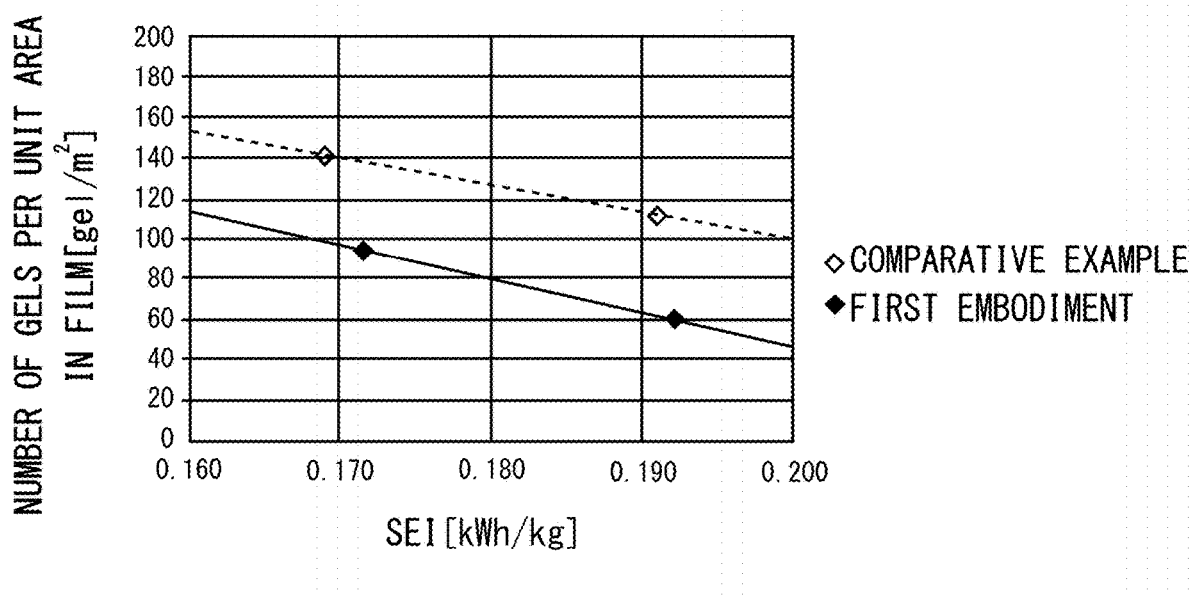
FIG. 8 is a graph showing results of a test in which kneading performance of the rotor-type screw according to the first embodiment is compared with kneading performance of the rotor-type screw according to the comparative example.

FIG. 8 is a graph showing results of a test in which the kneading performance of the rotor-type screw according to the first embodiment is compared with the kneading performance of the rotor-type screw according to the comparative example. In FIG. 8, the horizontal axis indicates SEI [kWh/kg] and the vertical axis indicates the number of gels per unit area [gel/m$^2$] in the film. The solid line shown in FIG. 8 is an approximate line obtained from results of the resin extruder in which the rotor-type screw according to the first embodiment is employed and the broken line shown in FIG. 8 is an approximate line obtained from results of the resin extruder in which the rotor-type screw according to the comparative example is employed. It can be estimated from the approximate line shown in FIG. 8 that the number of gels in the film is reduced by 20-50 percent in the case in which the rotor-type screw according to the first embodiment is employed compared to the case in which the rotor-type screw according to the comparative example is employed if the SEI is the same.

Comparing the case in which the rotor-type screw according to the first embodiment is employed with the case in which the rotor-type screw according to the comparative example is employed, it can be considered that, if the value of the SEI is the same, the deformation energy applied to the resin material is substantially the same. Therefore, the number of gels in the film is significantly reduced in the case in which the rotor-type screw according to the first embodiment is employed than the number of gels in the film in the case in which the rotor-type screw according to the comparative example is employed. It can therefore be said that effects of the extensional deformation can be efficiently exerted on the resin material.

The inventors of the present invention have found through the above test that the value of the ratio of the size of the gap at the front point of the top part 33*b* in the rotation direction to the size of the gap at the rear point thereof (the size of the gap at the front point/the size of the gap at the rear point) is equal to or larger than 2 or equal to or smaller than ½. The inventors of the present invention have also found through the above test that whichever one of the size of the gap at the front point of the top part 33*b* in the rotation direction and the size of the gap at the rear point thereof is smaller than the other one is preferably equal to or smaller than ¹⁄₁₀ of the diameter of the cylinder. The inventors of the present invention have also found through this test that the lead of each of the flights 33*a* and 34*a* is four or more times larger than the diameter of the cylinder 20.

<Modified Example 1 of Shape of Rotor-Type Screw According to First Embodiment>

Next, Modified Example 1 of the rotor-type screws 33 and 34 (see FIGS. 5 and 6) according to the first embodiment will be described.

Figure 9:
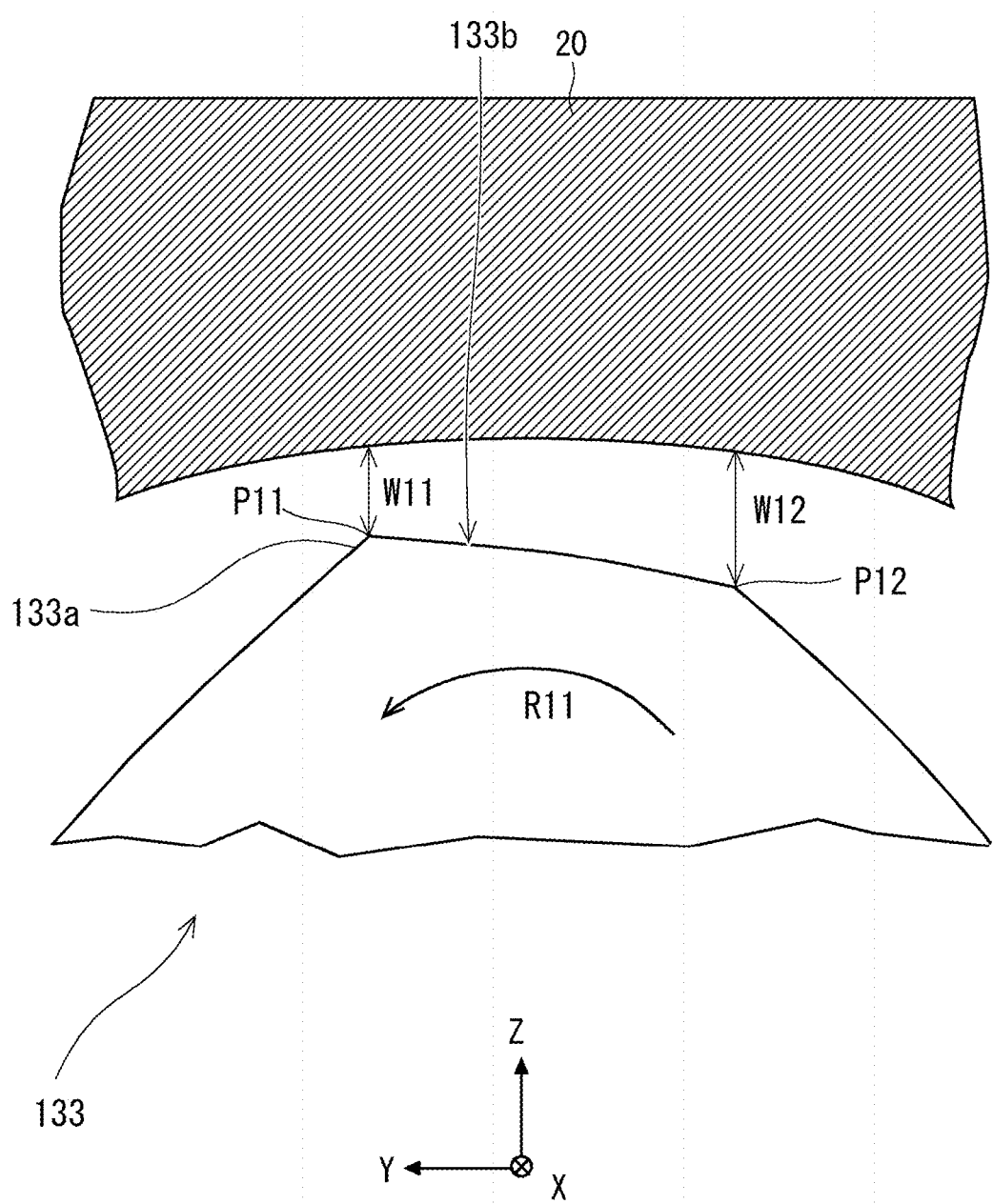
FIG. 9 is a diagram describing Modified Example 1 of the shape of the rotor-type screw according to the first embodiment.

FIG. 9 is a diagram describing Modified Example 1 of the shape of the rotor-type screw according to the first embodiment. FIG. 9 corresponds to the enlarged view of FIG. 6. Further, since the rotor-type screws 33 and 34 have the same shape, in Modified Example 1, a rotor-type screw 133 that corresponds to the rotor-type screw 33 will be described as a representative example. As shown in FIG. 9, in the rotor-type screw 133, a top part 133*b* of a flight 133*a* is formed in such a way that the size of the gap between the top part 133*b* and the inner surface of the cylinder 20 is gradually increased from a front point P11 to a rear point P12 in the cross section that is vertical to the axial direction. Hereinafter, the gap between the top part 133*b* and the inner surface of the cylinder 20 is simply referred to as a gap. That is, a size W12 of the gap at the rear point P12 of the top part 133*b* in a rotation direction R11 is larger than a size W11 of the gap at the front point P11 thereof.

Figure 10:
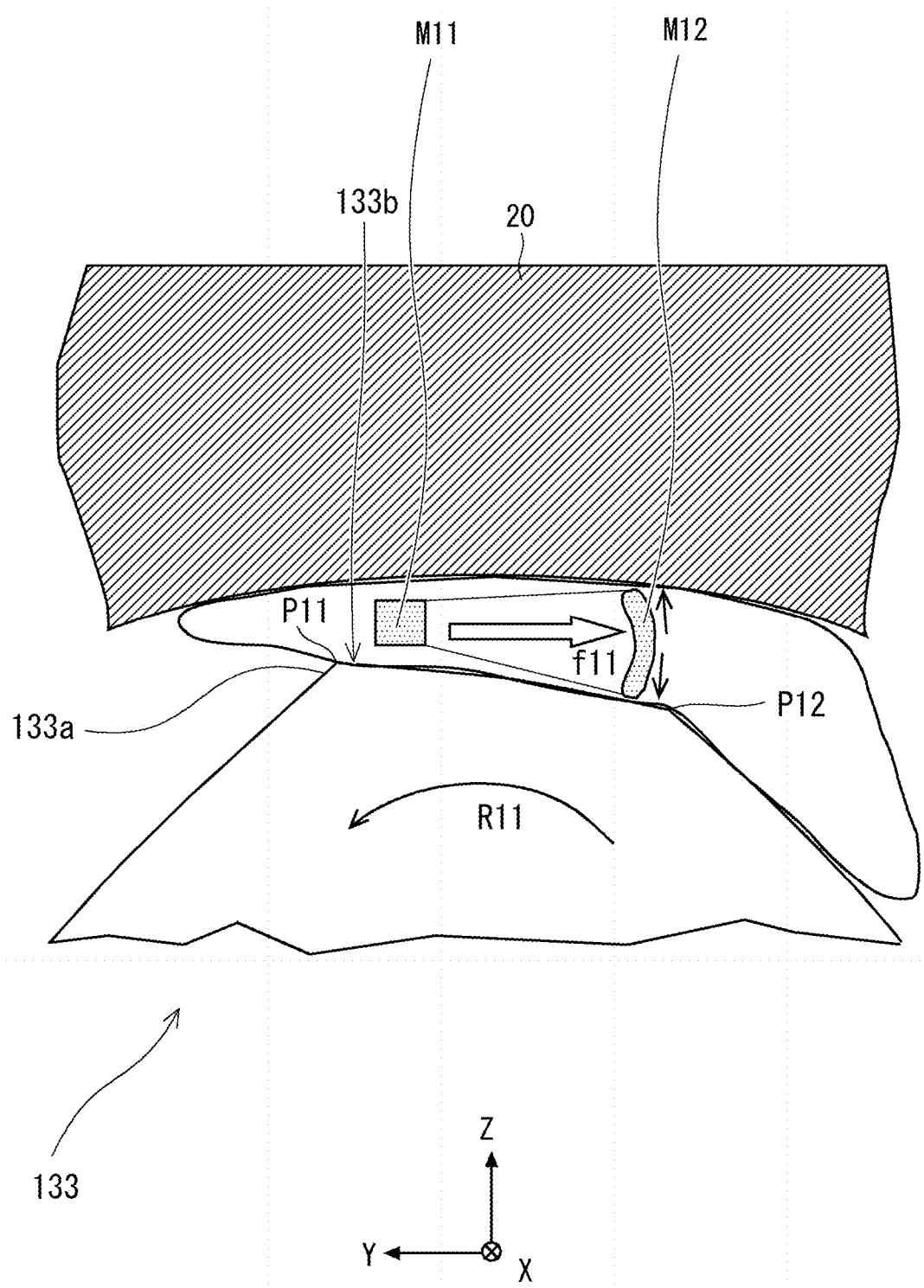
FIG. 10 is a schematic view showing effects of extensional deformation exerted on a resin material by a rotor-type screw according to Modified Example 1.

FIG. 10 is a schematic view showing effects of the extensional deformation exerted on the resin material by the rotor-type screw according to Modified Example 1. As shown in FIG. 10, when the rotor-type screw 33 is rotated in the direction of the arrow R11, the resin material that is present in the gap flows in the direction of an arrow f1. A high stress and a high pressure are applied to the resin material that is present in the gap. When a matrix M11 which is at the entrance of the gap is pushed and made to flow in the direction of the arrow f11 in a conical channel under a high stress, a high pressure, and a high flow resistance, the matrix M11 is elongated in the direction substantially vertical to the direction of the arrow f11 and is deformed like a matrix M12 at the exit of the gap. Here, the entrance of the gap is positioned at the front point P11 of the top part 133*b* of the flight 133*a* in the rotation direction and the exit of the gap is positioned at the rear point P12 of the top part 133*b* of the flight 133*a* in the rotation direction.

As described above, when the size of the gap is gradually increased from the front point P11 to the rear point P12 of the top part 133*b* in the rotation direction, the base material of the resin material that passes through the gap is elongated. When the base material of the resin material is elongated, the base material tends to collapse, which promotes kneading of a plurality of base materials that are components of the resin material.

<Modified Example 2 Having Shape of Rotor-Type Screw According to First Embodiment>

Next, Modified Example 2 of the rotor-type screws 33 and 34 (see FIGS. 5 and 6) according to the first embodiment will be described.

Figure 11:
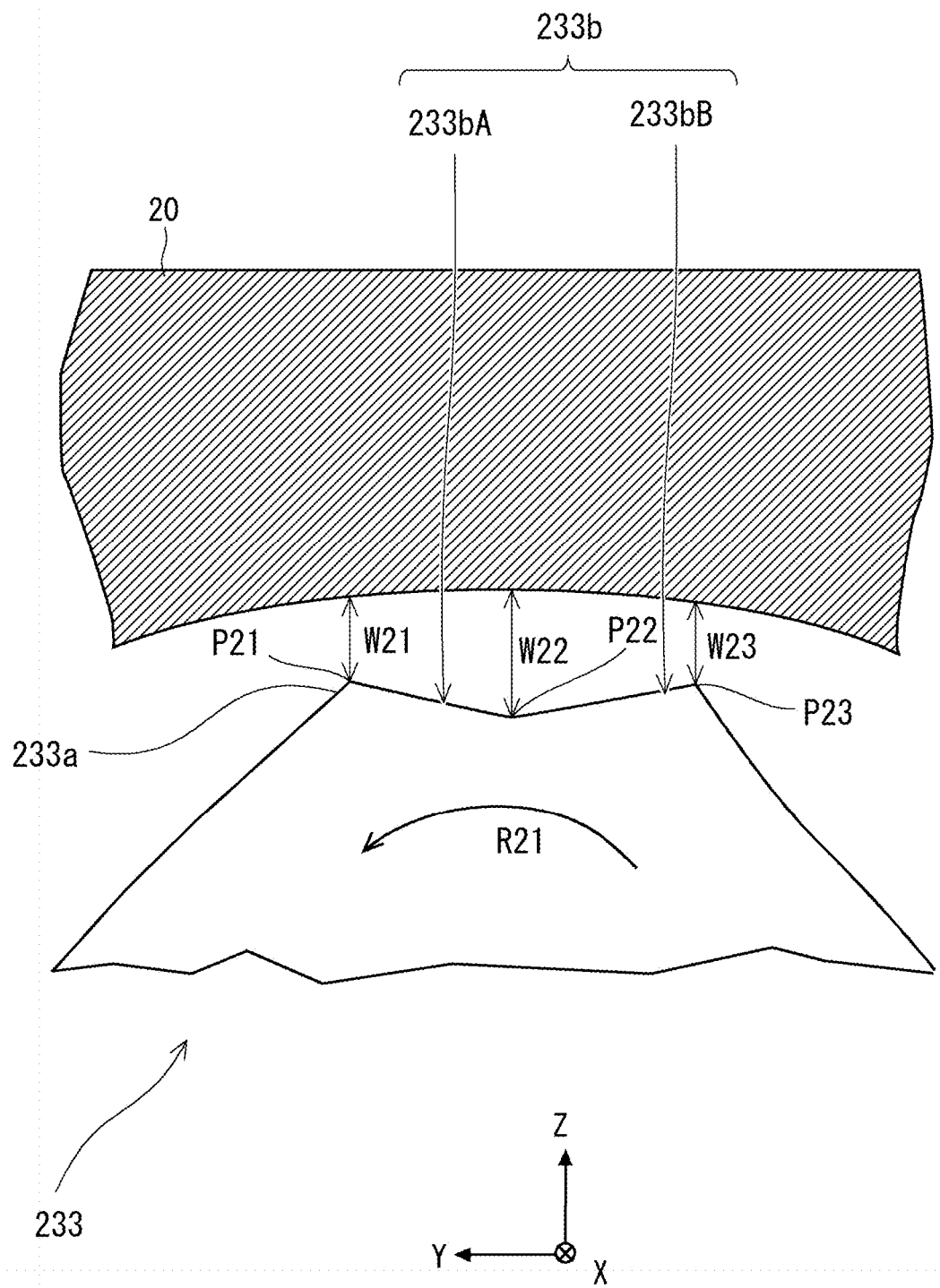
FIG. 11 is a diagram describing Modified Example 2 of the shape of the rotor-type screw according to the first embodiment.

FIG. 11 is a diagram describing Modified Example 2 of the shape of the rotor-type screw according to the first embodiment. FIG. 11 corresponds to the enlarged view of FIG. 6. Further, since the rotor-type screws 33 and 34 have the same shape, in Modified Example 2, a rotor-type screw 233 that corresponds to the rotor-type screw 33 will be described as a representative example. As shown in FIG. 11, in the rotor-type screw 233 according to Modified Example 2, a front part 233*b*A of a top part 233*b* of a flight 233*a* is formed in such a way that the size of the gap is gradually increased from a front point P21 to a rear point P22, like in the top part 133*b* shown in FIG. 9. That is, a size W22 of the gap at the rear point P22 of the top part 233*b* in a rotation direction R21 is larger than a size W21 of the gap at the front point P21 thereof.

Further, in the rotor-type screw 233 according to Modified Example 2, a rear part 233*b*B of the top part 233*b* of the flight 233*a* is formed in such a way that the size of the gap is gradually decreased from the front point P22 to a rear point P23, like in the top part 33*b* shown in FIG. 6. That is, a size W23 of the gap at the rear point P23 of the top part 233*b* in the rotation direction R21 is smaller than the size W22 of the gap at the front point P22 thereof.

When the size of the gap is changed from the front point to the rear point of the top part 233*b* in the rotation direction, effects of the extensional deformation can be exerted on the resin material that passes through the gap. This promotes kneading of the resin material.

<Modified Example 3 of Shape of Rotor-Type Screw According to First Embodiment>

Next, Modified Example 23 of the rotor-type screws 33 and 34 (see FIGS. 5 and 6) according to the first embodiment will be described.

Figure 12:
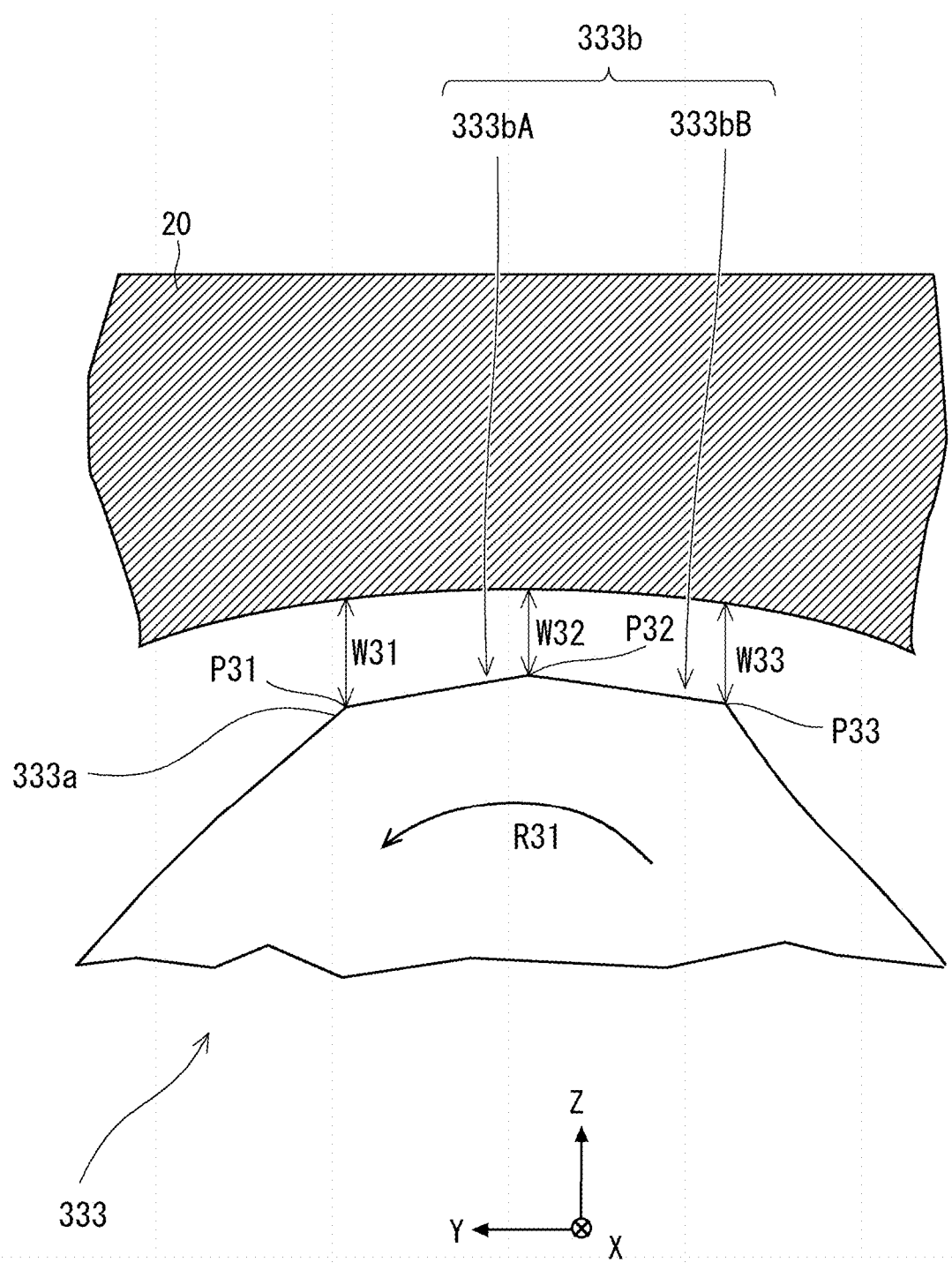
FIG. 12 is a diagram describing Modified Example 3 of the shape of the rotor-type screw according to the first embodiment.

FIG. 12 is a diagram illustrating Modified Example 3 of the shape of the rotor-type screw according to the first embodiment. FIG. 12 corresponds to the enlarged view of FIG. 6. Further, since the rotor-type screws 33 and 34 have the same shape, in Modified Example 3, a rotor-type screw 333 that corresponds to the rotor-type screw 33 will be described as a representative example. As shown in FIG. 12, in the rotor-type screw 333 according to Modified Example 3, a front part 333*b*A of a top part 333*b* of a flight 333*a* is formed in such a way the size of the gap is gradually decreased from a front point P31 to a rear point P32, as shown in the top part 33*b* shown in FIG. 6. That is, a size W32 of a gap at the rear point P32 of the top part 333*b* in a rotation direction R31 is smaller than a size W31 of a gap at the front point P31 thereof.

Further, in the rotor-type screw 333 according to Modified Example 3, a rear part 333*b*B of the top part 333*b* of the flight 333a is formed in such a way that the size of the gap is gradually increased from a front point P32 to a rear point P33, like in the top part 133b shown in FIG. 9. That is, a size W33 of the gap at the rear point P33 of the top part 333b in the rotation direction R31 is larger than the size W32 of the gap at the front point P32.

When the size of the gap is changed from the front point to the rear point of the top part 333b in the rotation direction, effects of the extensional deformation can be exerted on the resin material that passes through the gap. This promotes kneading of the resin material.

While the invention made by the present inventors has been specifically described based on the embodiments, it is needless to say that the present invention is not limited to the embodiments already stated above and may be changed in various ways without departing from the spirit of the present invention. The plurality of examples described above may be combined as appropriate.

This application is based upon and claims the benefit of priority from Japanese Patent Application No. 2019-181458, filed on Oct. 1, 2019, the disclosure of which is incorporated herein in its entirety by reference.

REFERENCE SIGNS LIST

1 Resin Extruder
10 Driving Unit
11 Decelerator
13 Hopper
14 Outlet
20 Cylinder
21, 22 Screw
31, 32 Upstream Conveying Screw
33, 34, 133, 233, 333 Rotor-type Screw
35, 36 Downstream Conveying Screw
33a, 133a, 233a, 333a Flight
33b, 133b, 233b, 333b Top Part
33c Hole
37, 38 Rotation Axis
51 Resin Material

The invention claimed is:

1. A resin extruder comprising:
a cylinder; and
two rotor-type screws that are disposed in the cylinder and knead a resin material by rotating around respective parallel axis in same rotation direction, wherein
in each rotor-type screw, top and bottom parts of a flight are disposed opposite to each other with respect to an axis line and are formed in such a way that gaps between the top and bottom parts and an inner surface of the cylinder are changed from a front point to a rear point of the rotor-type screw in the rotation direction in a cross section that is vertical to an axial direction,
the top part of each flight is twisted in a spiral shape with respect to the axis line,
in each rotor-type screw, the top and bottom parts of the flight are formed in such a way that the size of each gap is increased from the front point to the rear point of the rotor-type screw in the cross section that is vertical to the axial direction,
the size of the gap at the front point is equal to or smaller than $1/10$ of the diameter of the cylinder, and
a lead of each flight is four or more times larger than the diameter of the cylinder.

2. The resin extruder according to claim 1, wherein a value of a ratio of the size of each gap at the front point to the size of the gap at the rear point is equal to or smaller than $1/2$.

3. A rotor-type screw for an extruder that kneads a resin, wherein
top and bottom parts of a flight are formed in such a way that gaps between the top and bottom parts and an inner surface of a cylinder are changed from a front point to a rear point of the rotor-type screw in a rotation direction in a cross section that is vertical to an axial direction,
the top and bottom parts of the flight are disposed opposite to each other with respect to an axis line,
the top part is twisted in a spiral shape with respect to the axis line,
the top and bottom parts of the flight are formed in such a way that the size of each gap is increased from the front point to the rear point of the rotor-type screw in the cross section that is vertical to the axial direction,
the size of the gap at the front point is equal to or smaller than $1/10$ of the diameter of the cylinder, and
a lead of each flight is four or more times larger than the diameter of the cylinder.

4. The rotor-type screw according to claim 3, wherein a value of a ratio of the size of each gap at the front point to the size of the gap at the rear point is equal to or larger than 2 or equal to or smaller than $1/2$.

5. A resin manufacturing method comprising:
rotating a rotor-type screw that is disposed in a cylinder and in which top and bottom parts of a flight are formed in such a way that the size of each gap between the top and bottom parts and an inner surface of the cylinder is increased from a front point to a rear point of the rotor-type screw in a rotation direction in a cross section that is vertical to an axial direction; and
elongating a resin material that is present in the gap from the front to the rear in the rotation direction,
wherein the top and bottom parts of the flight are disposed opposite to each other with respect to an axis line,
the top part is twisted in a spiral shape with respect to the axis line,
the size of the gap at the front point is equal to or smaller than $1/10$ of the diameter of the cylinder, and
a lead of each flight is four or more times larger than the diameter of the cylinder.

* * * * *